United States Patent [19]
Casimaty et al.

[11] Patent Number: 5,860,244
[45] Date of Patent: Jan. 19, 1999

[54] SOD HANDLING SYSTEM

[75] Inventors: Gabriel Casimaty, Richmond, Australia; Gerardus J. Brouwer, Keswick, Canada; Ian Fraser, Brunswick, Australia

[73] Assignee: StrathAyr Pty. Limited, Richmond, Australia

[21] Appl. No.: 778,957

[22] Filed: Jan. 6, 1997

Related U.S. Application Data

[63] Continuation of Ser. No. 256,655, Oct. 31, 1994, Pat. No. 5,590,488.

[30] Foreign Application Priority Data

| Jan. 21, 1992 | [AU] | Australia | PL0495/92 |
| Feb. 21, 1992 | [AU] | Australia | PL0988/92 |
| Jul. 14, 1992 | [AU] | Australia | PL3490/92 |

[51] Int. Cl.⁶ .............................. A01C 29/00; A01B 79/00
[52] U.S. Cl. ................ 47/1.01 R; 47/58; 242/564.5; 198/463.1; 198/717; 172/19; 172/133
[58] Field of Search .................... 47/1.01 R, 58; 242/564.5; 198/463.1, 717; 172/19, 133

*Primary Examiner*—Leon B. Lankford, Jr.
*Attorney, Agent, or Firm*—Edwin D. Schindler

[57] ABSTRACT

We provide methods and apparatus for handling sod which includes a washing machine in which the water is recycled and during recycling the soil removed from the sod is delivered for reuse. We also provide a method of delivering and take up of rolls of sod in which the peripheral speed of the roll remains constant regardless of the roll diameter; we display methods of physically working sod to remove soil therefrom and also methods of handling sod by supporting it with a flexible mesh where there is likely to be stress on the sod.

4 Claims, 11 Drawing Sheets

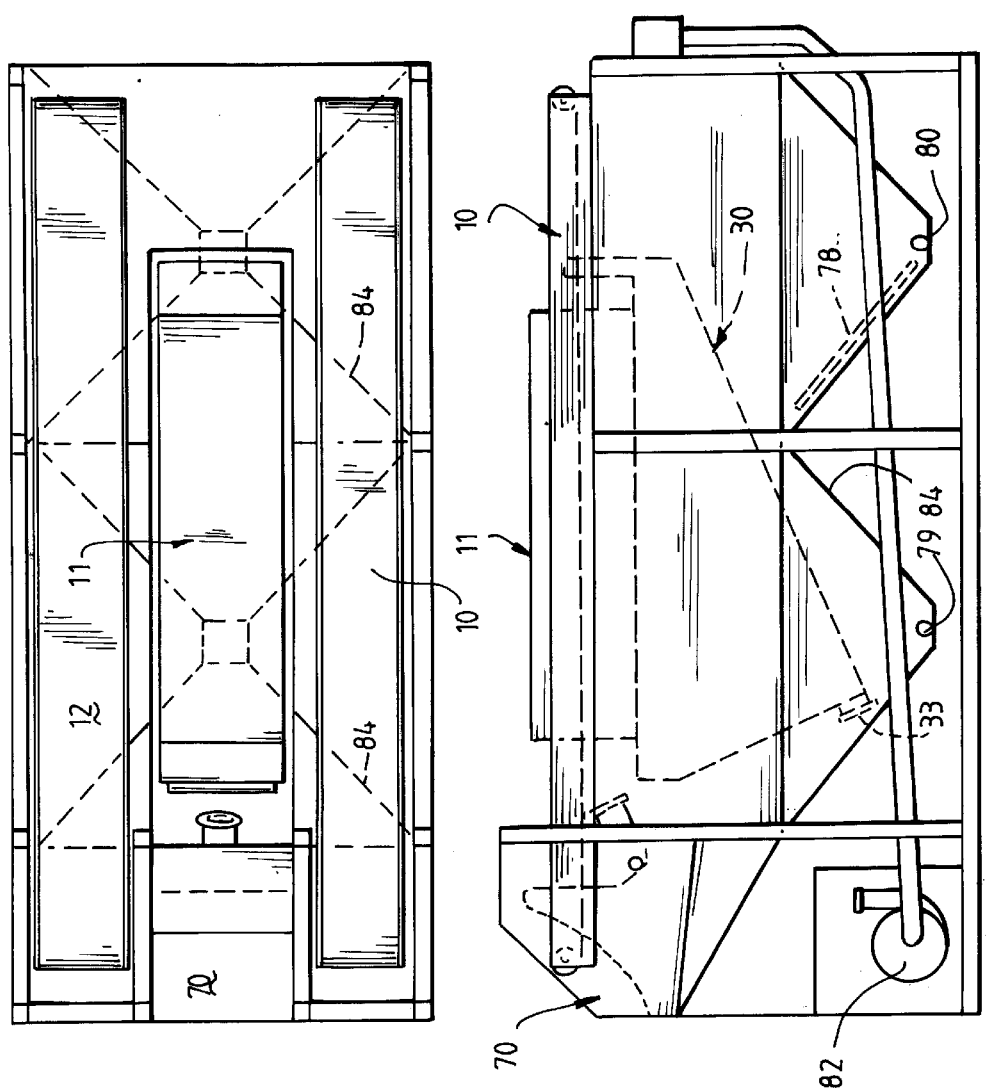

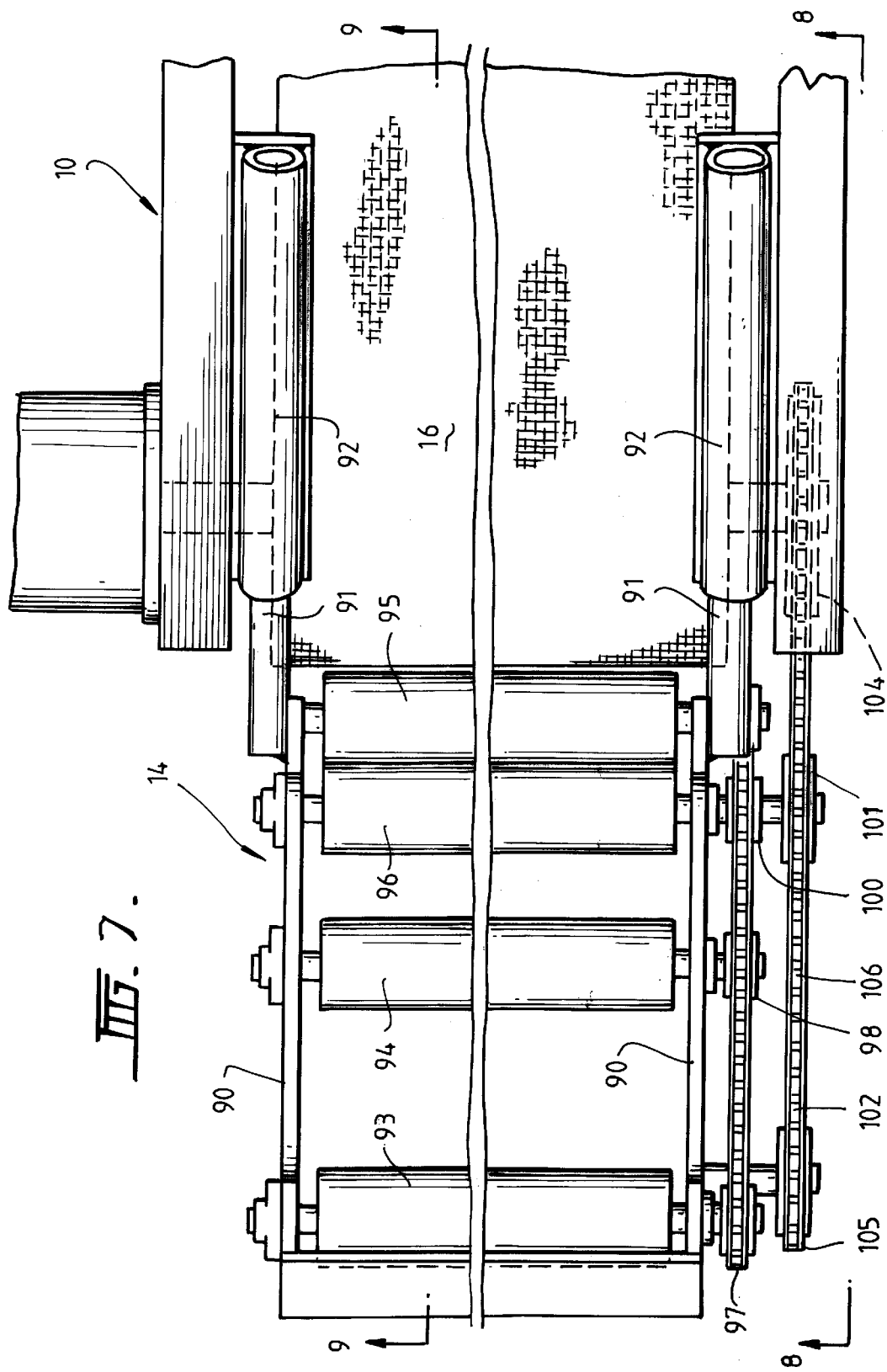

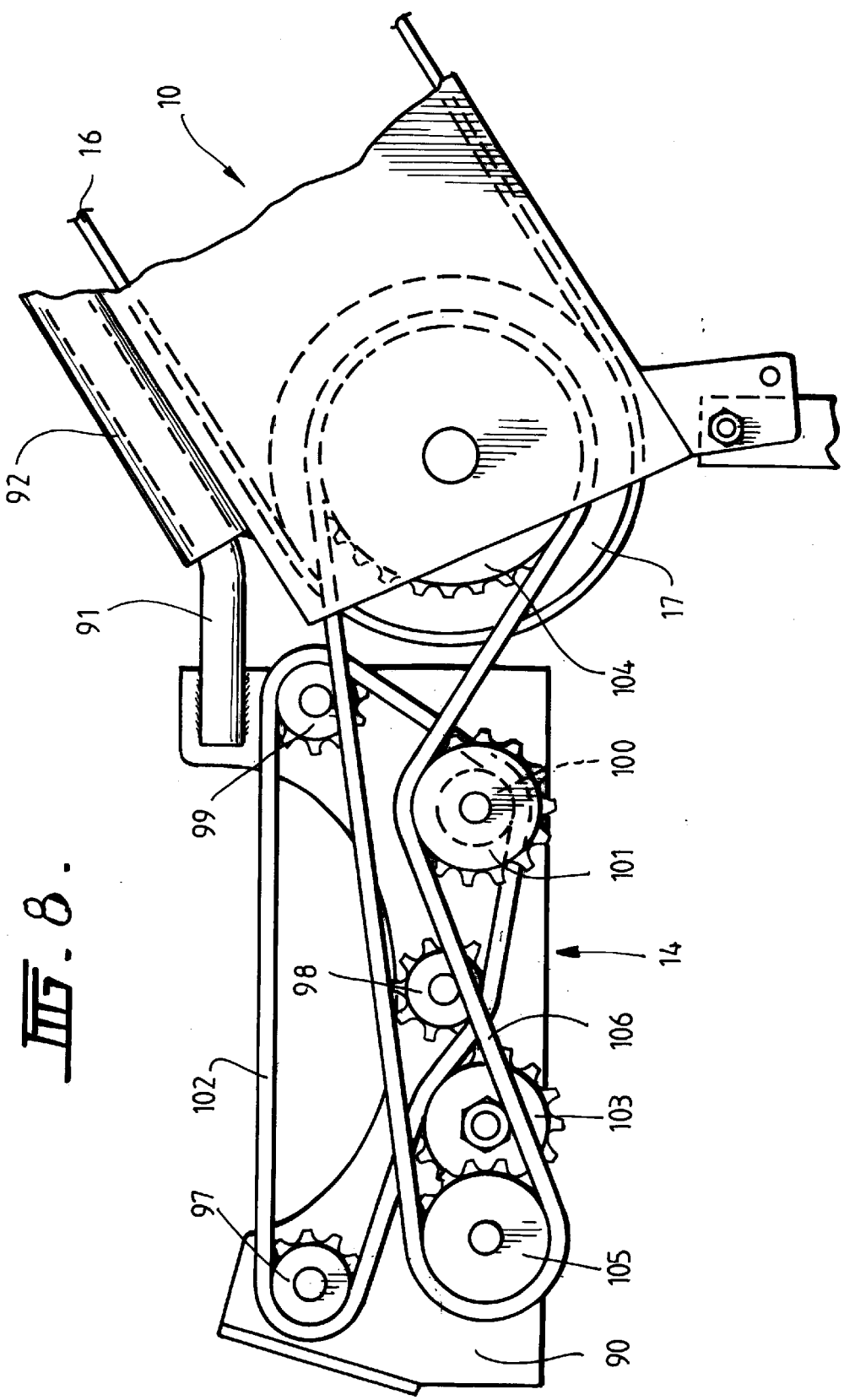

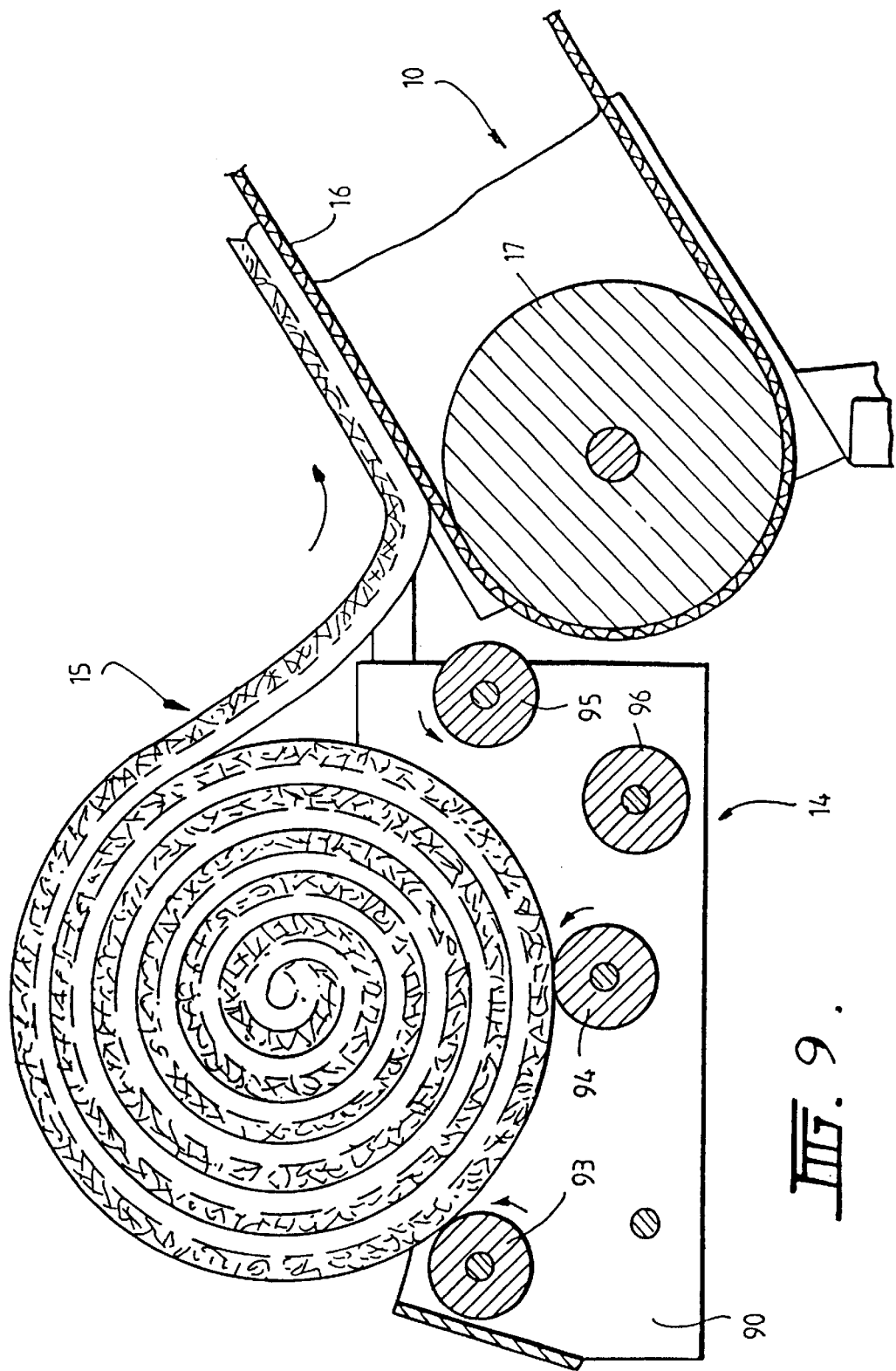

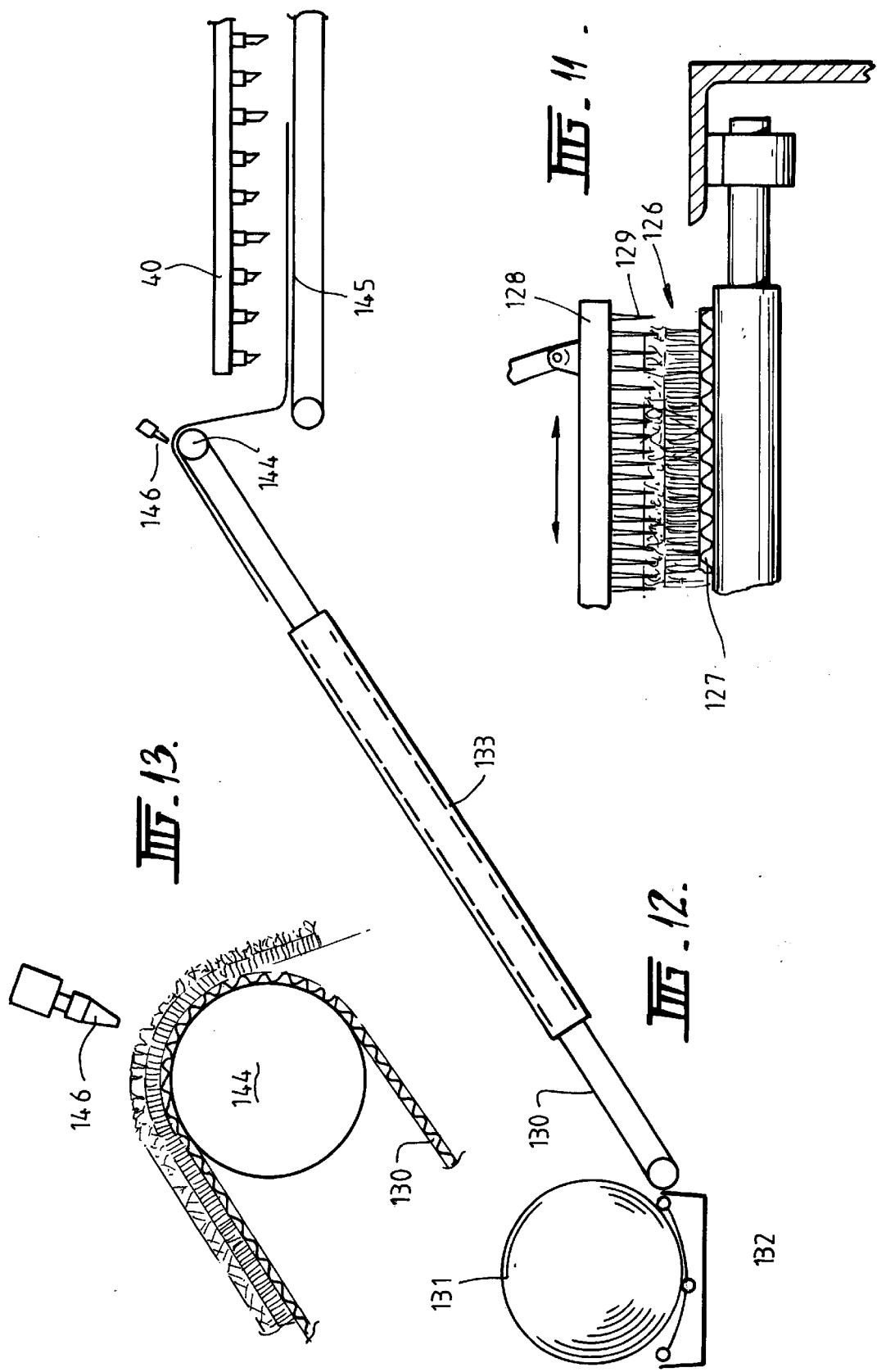

SOD HANDLING SYSTEM

This is a continuation of application Ser. No. 08/256,655, filed Oct. 31, 1994, now U.S. Pat. No. 5,590,488.

This invention relates to sod handling and is particularly applicable to sod washing systems but can also be applied to harvesting and other processing of sod.

The term sod in this specification, which is used in some countries in the world, can be considered to be identical to turf, which is used in other countries, and in each case is the upper stratum of soil which contains the roots of grass and, indeed, the processes which we will be describing have to do with the harvesting and the handling of grasses and in particular to grasses which are grown for this purpose.

There is a recognised primary industry of sod growing and the sod so grown is harvested by the use of a cutter blade which passes through the sod at a predetermined depth to ensure that a required quantity of the root mass is retained and two such harvesting systems, which are purely exemplary, can be seen in U.S. Pat. No 4,944,352 of Brouwer et al and U.S. Pat. No 5,064,000 of Dover et al.

It is also known to take the sod so harvested and to remove from the sod the soil, which may include sand and other organic matter by a washing process and the original form of this process is illustrated in U.S. Pat. No 4,063,384 of Warren et al.

The present invention is not directed specifically to the harvesting step but can provide, in one aspect, in association with a harvester, means whereby some or all of the soil (and in this specification we shall henceforth refer to soil to include sand, humus and other organic or non-organic matter which is enmeshed in the root mass) can be removed as part of the harvesting step or separately therefrom.

Whilst the Warren type process has been further developed by Strathayr and now provides an end product which is satisfactory, it does have two ancillary aspects which are less than satisfactory.

The first of these is that it uses very substantial quantities of water. This, of course, is not desirable if water supplies are restricted and, even where there is substantial water, it can in itself lead to difficulties.

The wash water, after it has been used to remove soil, can often have relatively high nutrient values and may also have weed seeds or vegetative plant material and, for these reasons, it may not be acceptable, or even legal, to pass the waste water into natural water courses as the nutrients and other foreign material can be most undesirable. For example, nutrients can feed blue/green algae and other undesirable organisms and undesirable plants can be spread along the water course.

The second is that the water entrains substantial quantities of soil fines, the heavier particles will tend to rapidly drop out before reaching the watercourse, and, again, it is not desirable that large quantities of soil be fed to water courses.

In order to overcome these difficulties it may be necessary to provide large settlement ponds in which the water can be passed and from which, in some cases, the water can be recycled after settling and further in which, if necessary, the water can be treated to remove the nutrients. At the same time in these ponds the fines drop out of the water and can be recovered.

In one aspect of the invention, we provide a method of recycling water in such a way that a large percentage of the solid material is removed therefrom and can be readily returned to the field and the quantity of water which needs treatment is very substantially reduced.

We also include, in further aspects of the invention, handling methods for the delivery or take up of sod from a roll to or from a conveyor and methods of supporting sod to prevent physical damage thereto.

Further, washing processes are restricted by the quantity of soil to be removed and in a still further aspect of the invention we provide a treatment process which can be used in association with a washing process to effect preliminary removal of at least part of the soil which system can, in some cases, even totally replace a washing process where the soil is very friable.

The invention, in one aspect provides a sod washing system in which the water is recycled including a tank, an inlet adjacent one end of the tank, an outlet adjacent the opposite end, the tank outlet being connected to a pump whereby the water from the tank can be passed to a washing station and expressed through nozzles to remove soil from sod located therebeneath, a receiver for the water and any soil removed from the sod, the receiver being in connection with the tank inlet, a second outlet in or adjacent the floor of the tank through which soil which is deposited from the water can be removed from the tank.

The tank may have at least one baffle to ensure that the liquid passing from the inlet to the outlet takes a convoluted path.

More specifically, the sod washing system includes a tank which has two lower positions which are separated by a higher portion, a second outlet associated with each lower position, a baffle extending from the top of the tank between the input and the first lowest position so that water passing into the inlet is caused to pass beneath the baffle and tends to rise because of the higher portion, the arrangement being such that the velocity of the water through the tank changes and soil entrained in the water falls out of the suspension and due to the shape of the tank moves towards the second outlets from whence it can be removed from the tank.

Whilst in the process of the present invention we have described water under pressure passing through the nozzles, it is possible to use pulsating water jets to effect the washing action. These may be used alone or in combination with jets which provide a continuous stream of water.

In another aspect, we provide a delivery or take up cradle for handling sod in rolls including a number of rollers so located that the roll, no matter what size is supported by some at least of the rollers and means to drive at least one roller so that a sod can be delivered from or taken up by the cradle at a constant linear speed.

In a still further aspect, we provide a method of soil removal from sod in which the sod is subjected to physical working to remove the soil therefrom.

The physical working can be by brushing, working with flexible fingers, deforming the sod to release the soil therefrom, vibrating the sod or using air or a mixture of air and water to effect removal of the soil.

In a still further aspect, we provide a method of handling sod during processing of the sod including having a sheet of a mesh material associated with the sod and wherein the mesh material is maintained in association with the sod at least during some of the processing period.

The mesh may be retained in contact with the sod during processing or it can be removed whilst specific treatment is applied and replaced subsequent to the treatment or can be removed before treatment and a different material be associated with the sod after the particular treatment process.

In order that the specification can be more readily understood and put into practice reference will be made to the accompanying drawings which illustrate various embodiments of the invention.

In these drawings:

FIG. 5 is a top view of the machine of the earlier Figures set up for transport;

FIG. 6 is a side elevation view of the machine in the condition of FIG. 5;

FIG. 7 is a view along line 7—7 of FIG. 1 showing the input cradle for the machine;

Figure 10:
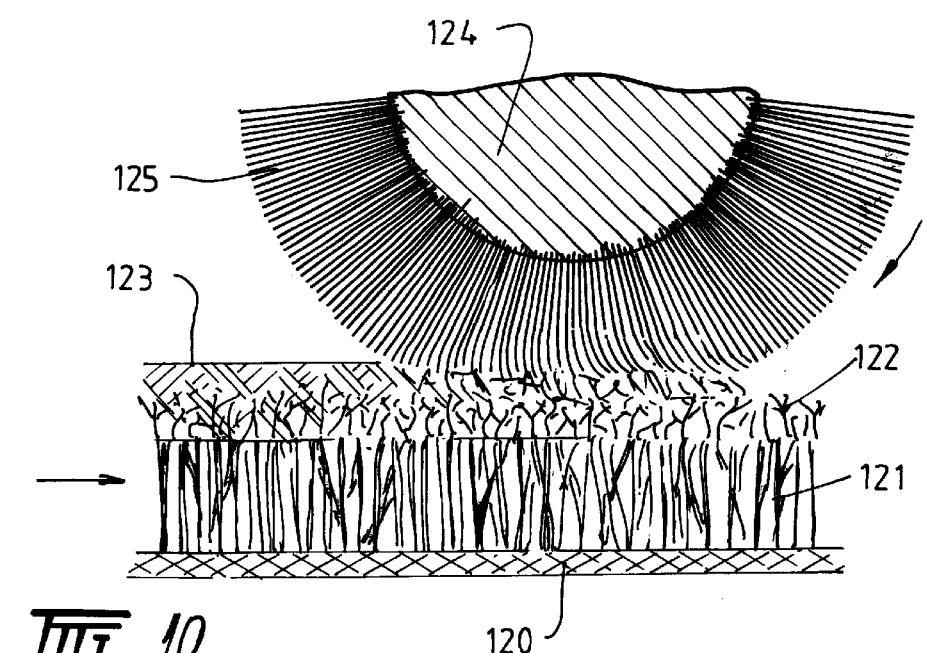
Figure 14:
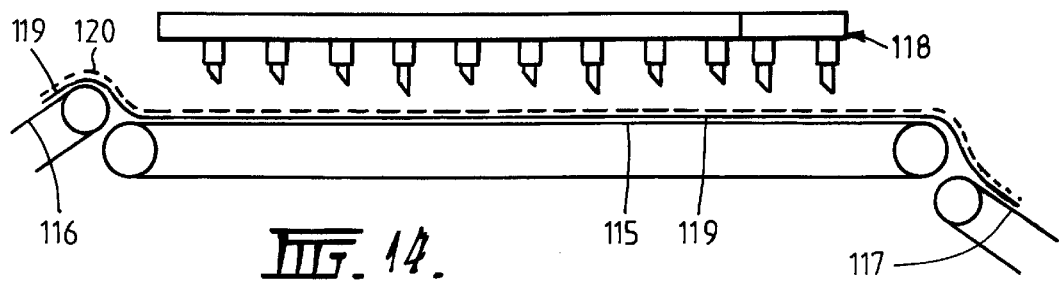
Figure 15:
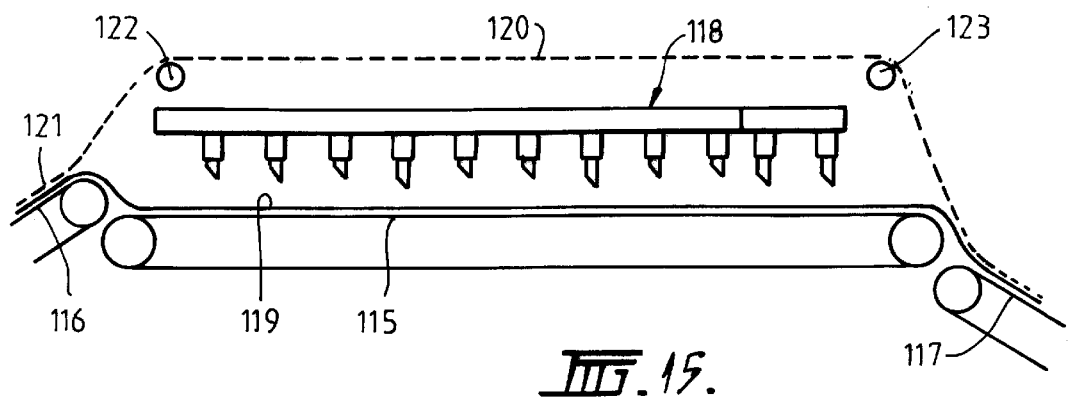
Figure 16:
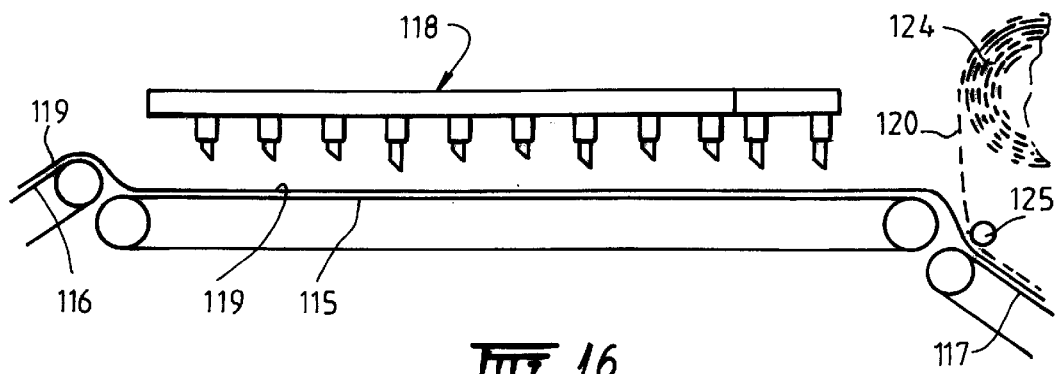
Figure 17:
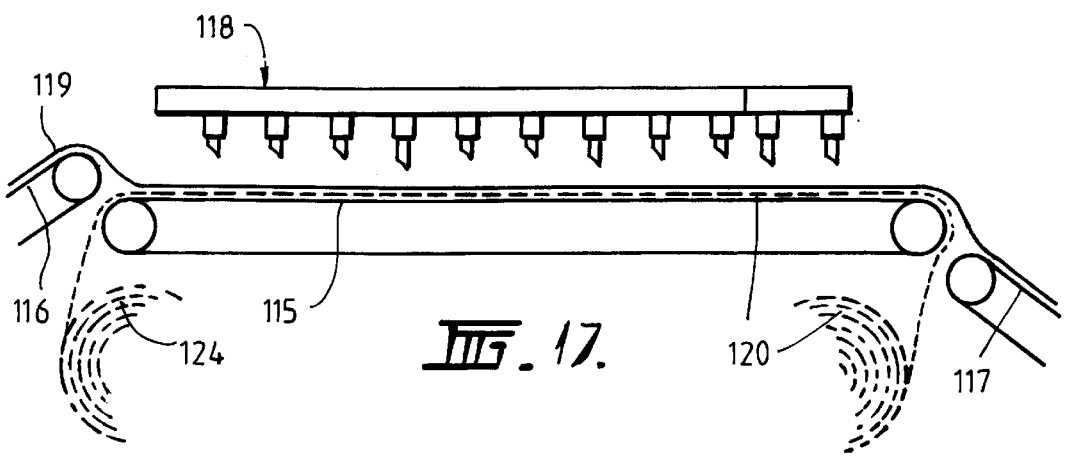
Figure 18:
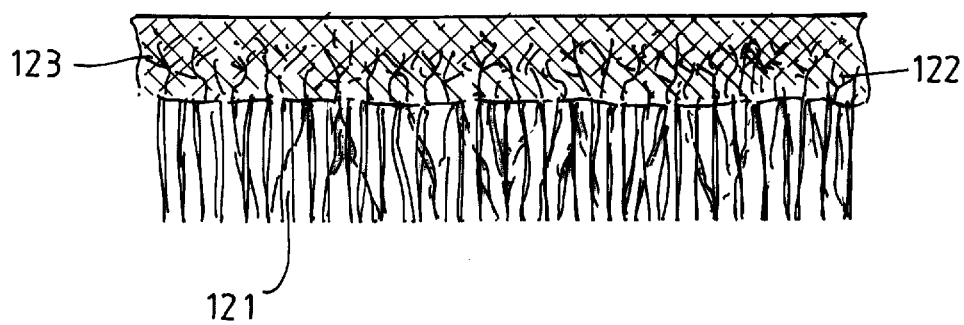
Figure 19:
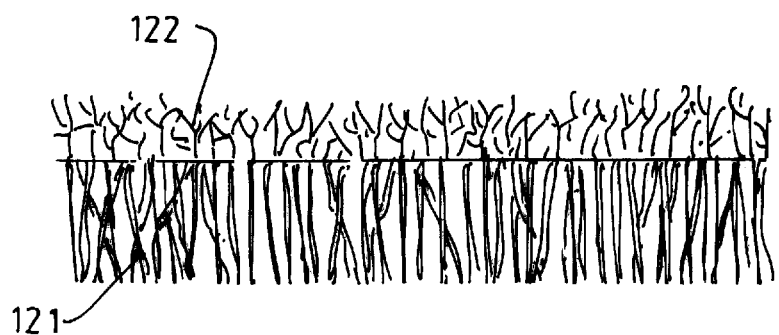

FIG. 8 a side elevation view along line 8—8 of FIG. 7 showing the drive arrangement for the rollers of the cradle;

FIG. 9 is a sectional view somewhat similar to FIG. 8 and taken along line 9—9 of FIG. 7 showing a roll mounted in the cradle;

FIG. 10 is a partial view showing a brushing operation on sod as it passes along a conveyor and whereby a certain amount of the soil is removed therefrom;

FIG. 11 is a transverse view showing sod on a conveyor and having dirt removed therefrom by moving fingers;

FIG. 12 is a view of a conveyor having vibration means and, at the upper end of which, the sod is caused to move through a substantial angle and at which an air blast is used to dislodge loose portions of the soil;

FIG. 13 is an enlarged view of the top portion of the conveyor of FIG. 12;

FIG. 14 is a schematic view showing sod supported by a mesh material passing through a washing process;

FIG. 15 shows a means of separating the mesh from the sod whilst the washing process is being effected but in which the sod is supported by the mesh both at the input and output ends of the process;

FIG. 16 shows a system wherein unsupported sod is fed to the washing station and mesh is associated with the sod as it leaves the washing station;

FIG. 17 shows a system where a supporting mesh is located beneath the sod as it enters the washing conveyor and is removed therefrom as it leaves the conveyor;

FIG. 18 is a schematic view of unwashed sod;

FIG. 19 is a schematic view of washed sod; and

Figure 20:
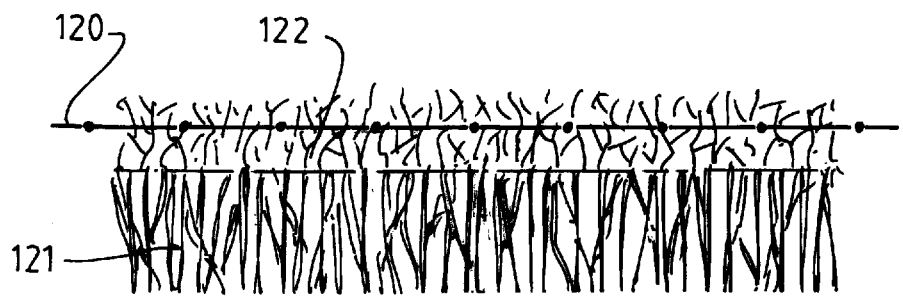

FIG. 20 is a schematic view of washed sod having supporting mesh located therein.

Figure 1:
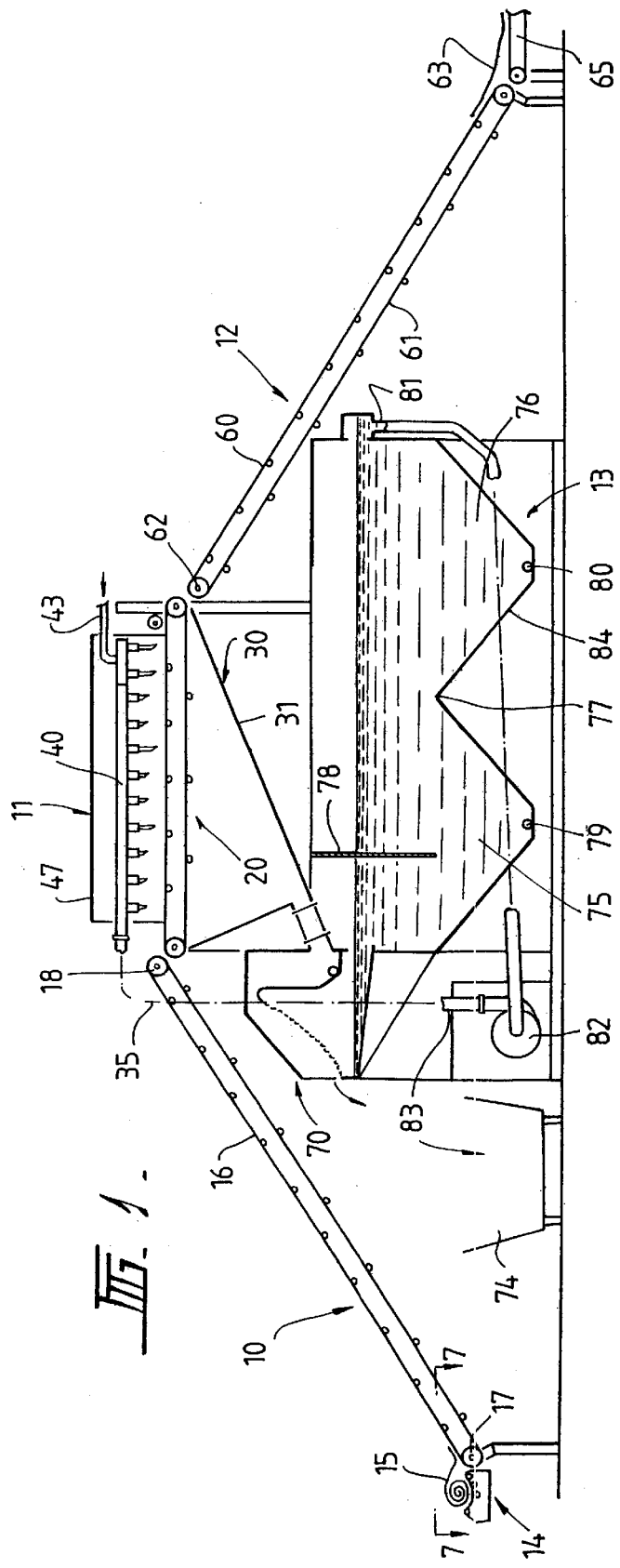
FIG. 1 is a side, partly sectioned view of a washing machine which recycles the water used.
Figure 2:
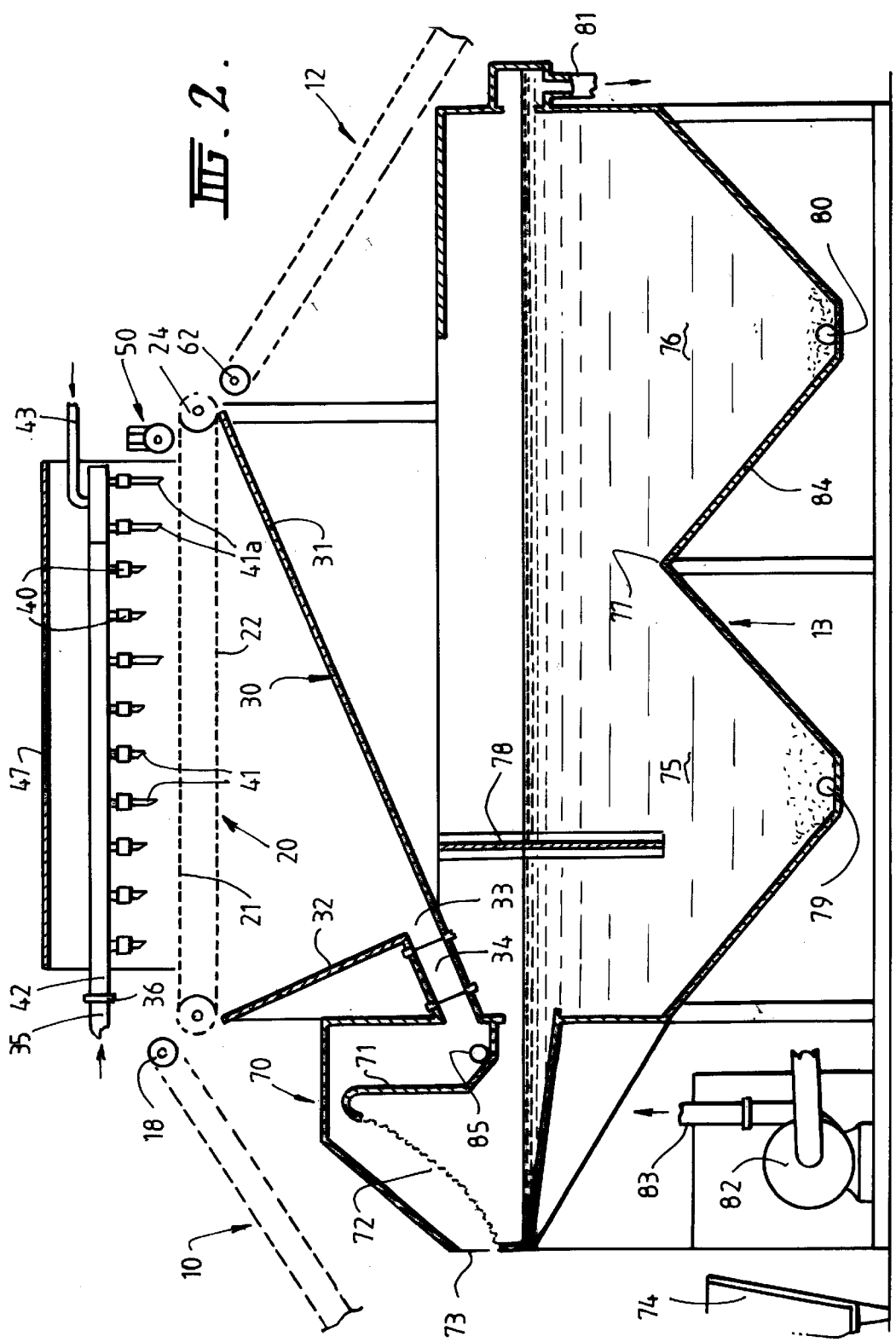
FIG. 2 is an enlarged view of the washing portion of FIG. 1.

Referring firstly to the first embodiment of the invention, which is sod washing machine adapted to provide washed sod, and which is generally illustrated in FIGS. 1, to 6 of the accompanying drawings. The machine is comprised of, an input conveyor system 10, a washing station 11, an output conveyor 12 and a water recycling arrangement 13.

Figure 3:
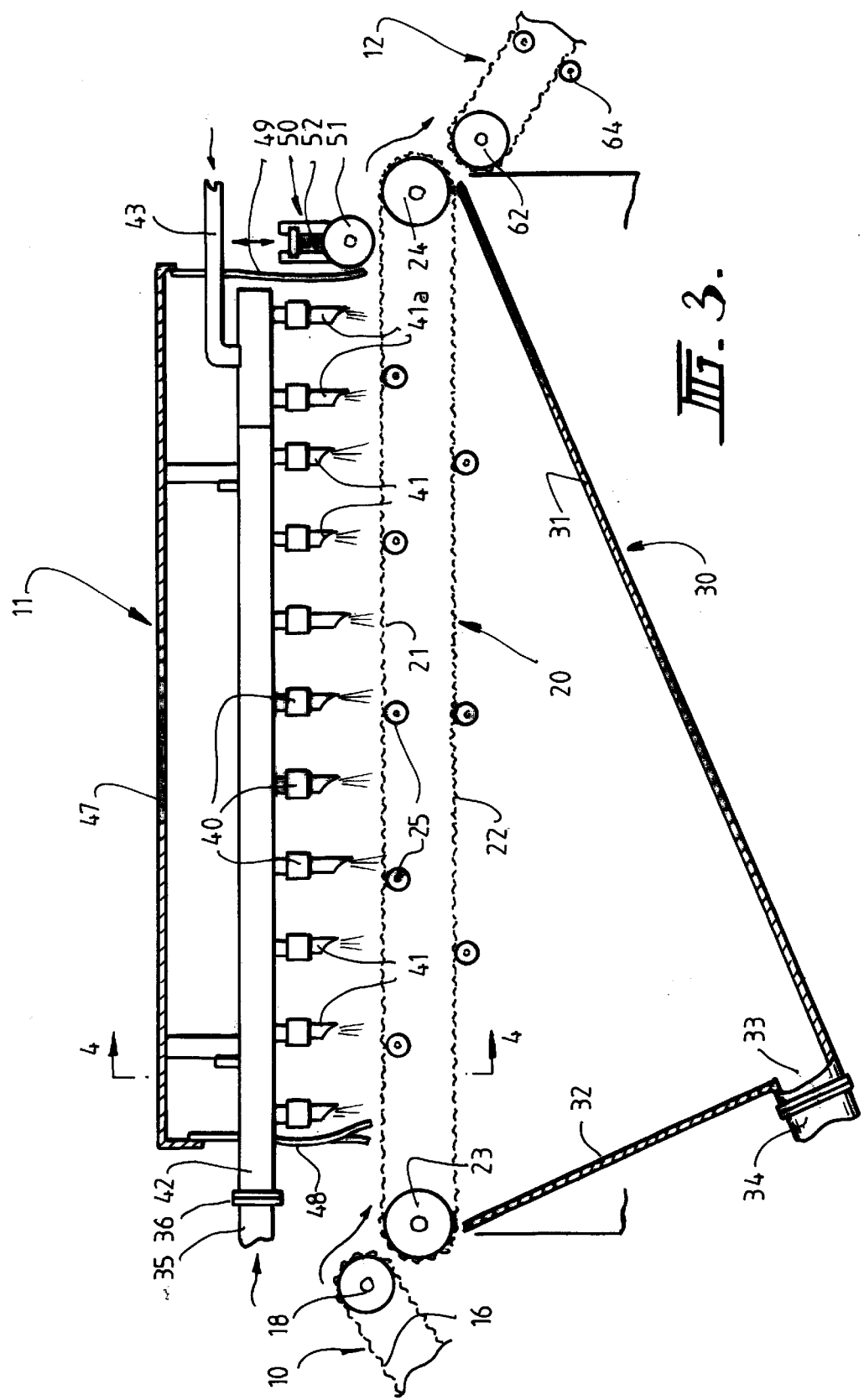
FIG. 3 is a further enlarged portion of the actual washing conveyor and nozzles shown in FIG. 2.

The input conveyor 10 has a cradle 14 on which a roll 15 of sod can be located the sod being adapted to be carried upwardly on the upper flight 16 of the input conveyor 10, which is mounted between pulleys 17 and 18 one of which at least is driven, with the sod thus being carried from a position where it can readily be handled on to the cradle 14 to the input of a washing conveyor 20 which is best illustrated in FIG. 3.

The conveyor 20 has upper flight 21 and lower flight 22 which pass around pulleys 23 and 24, one of which at least is driven, and the speed of drive of the conveyor is the same as the speed of movement of the upper flight 16 of the conveyor 10.

The conveyors of the machine can be driven by hydraulic motors or in any other conventional way and the device will not be further discussed.

The form of conveyor can vary but it is preferred that it be of an open mesh to permit water to pass therethrough.

Mounted beneath the conveyor there is a receiver 30 which is in the form of an open topped tank which extends the length of the conveyor 20. The receiver may have a bottom wall 31, an end wall 32 and side walls, not shown, and at the junction between the bottom wall 31 and the end wall 32 there is an outlet 33.

Mounted above the conveyor there are a number of spray bars 40 which are transversely located relative to the upper flight 21 and these spray bars have nozzles 41 extending there below.

The nozzles are in turn connected to a supply pipe 42 which can extend a substantial part of the length of the system but, as shown, we have a separate supply 43 which can feed the last two rows of nozzles, and this will be described hereafter.

The supply pipe 42 is connected to pipe 35 which, in turn, is connected to the output of a pump 82.

Also the supply pipe 42 can be connected to cross members 44 which can be mounted in slots 45 in part of a frame assembly 46 so the positioning of the nozzles relative to the upper flight 21 of the conveyor can be varied and, also, to permit ready removal of the whole of the spray assembly should this be required.

As illustrated the spray assembly is protected by a shroud 47 which may have resilient flaps 48, 49 at each end which act to restrict movement of water except through or over the sod on the upper conveyor flight 21 into the receiver 30, but which permit the passage of sod therebeneath. This control of water movement limits loss of water from the system.

At the output end I may provide a calender assembly 50 which comprises a roller 51 which is held by spring 52 in contact with the sod leaving the washing portion to squeeze the sod between the roller and the upper flight 21 of the conveyor so that excess moisture is removed therefrom and fed to the receiver 30.

Instead of using a calender roller, we could use a hollow perforated roller which has a sponge outer surface, the arrangement being such that moisture is absorbed by the sponge and then forced through the perforations to the centre of the roller. One end of the roller may be open so that the liquid so gathered can be passed therefrom and delivered into the receiver 30.

In an another alternative, we can form the conveyor after the sod leaves the washing station to be able to be vibrated and use vibration to effect removal of the water, the water so removed being passed to the receiver 30.

The output conveyor 12, to a degree, can be considered to be similar to the input conveyor 10 except, of course, that it operates in the opposite sense. This conveyor has an upper flight 60, a lower flight 61 is mounted between pulleys 62 and 63, at least one of which is driven and is supported by roller 64. The speed of operation of the conveyor 12 is the same as the speed of operation of the other conveyors 10 and 20 so that the sod moving therethrough is not stressed at the junction between the conveyors.

At the output end of the conveyor 12 we may provide a horizontal conveyor 65 which leads to a take up station or, alternatively, a take up station could be connected directly to the output end of the conveyor 12.

Mounted below the washing assembly 11 there is a recirculation tank 84 which is part of the recycling arrangement 13 and which has an input portion 70 which is in connection with the output 33 of the receiver 30 by way of connector 34 and has a weir 71 over which the water received in the receiver 30 passes. When this water reaches a predetermined level. This weir is in connection with a mesh screen 72 over and through which the water passes with the humus and any large solid material passing through the open front 73 into a receiving bin or container 74.

The input portion 70 may have a drain or the like 85 through which entrapped material which does not pass over the weir may be passed.

The water which passes through the screen 72 passes into the recirculation tank 84 which comprises a first portion 75 and a second portion 76 with the central part 77 being substantially higher than the two lower portions and acts as a separator therebetween. There is also a weir 78 located in the first portion 75 to one side of the centre thereof.

In the portion 75 there is an outlet 79 and in the portion 76 there is an outlet 80 through which solid material can pass as will be described later. At the far side of the portion 76 there is an outlet 81 whereby water can pass from the recirculating tank 84 to a pump 82, the output 83 of which provides water by way of the pipe 35 to the supply pipe 42. It will be appreciated that the various components described are mounted on sub-frames but as these in themselves are not part of the invention they will not be further described.

Figure 4:
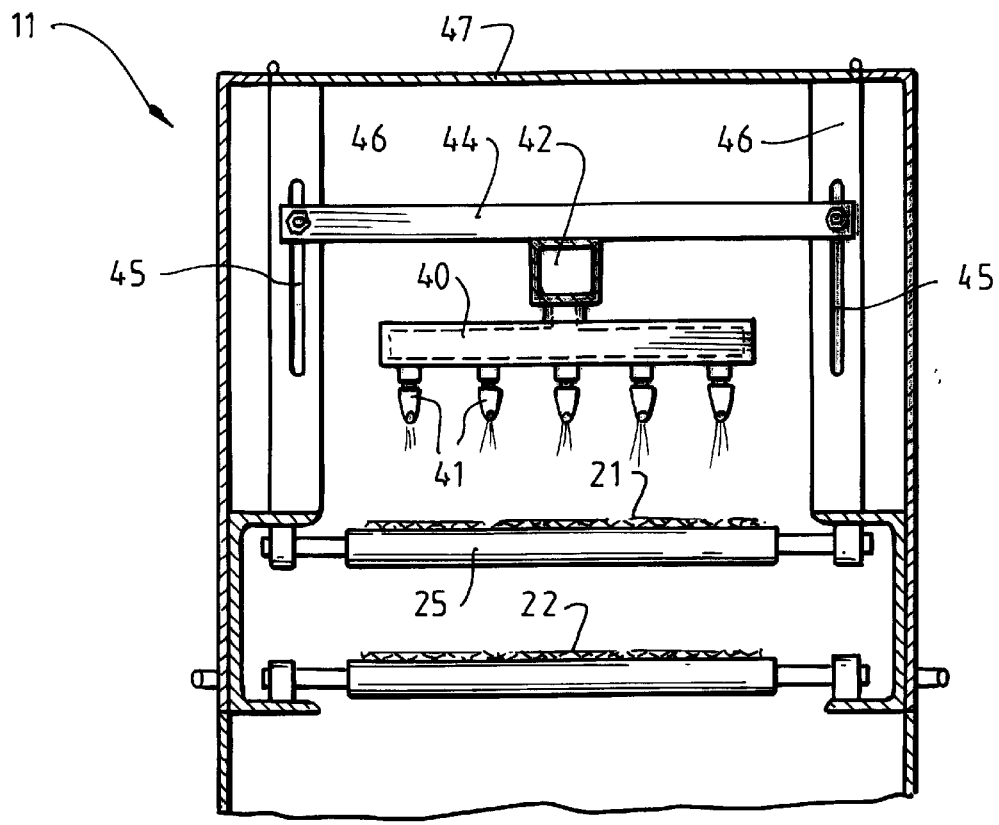
FIG. 4 is a transverse view of the washing conveyor of FIG. 3 looking in the direction of the arrows 4—4 of FIG. 3.

We have not, in the drawings, made reference to the width of the assembly, except as shown in FIG. 4 and it is to be appreciated that this will be dependant upon the width of the sod to be washed.

At the present time it is conventional in the sod industry to provide sod in narrow rolls, which may be 400 mm wide or wide rolls which may be say 1220 mm wide. The machine is equally applicable for use with either such size, or any other required size.

Also the assembly which comprises the washing station 11 and the recirculating tank 84 may be mounted on a trailer or the like or may be adapted for trailer or truck mounting so as to make the machine transportable and this will be described later herein.

The operation of the machine is as follows. Firstly the recirculating tank 84 must be filled with water and the size of this tank will be determined by the throughput of sod required.

Once the circulating tank 84 is filled there is generally enough water in the system to permit operation and at this time a roll 15 of sod is placed on the cradle 14, which will be further described later herein in relation to FIGS. 7 to 9, and is caused to move up the upper flight 16 of the conveyor 10 with the grass side down.

The sod moves along the length of the flight 16 until it passes over the pulley 18 at which stage it enters the flight 21 of the conveyor 20 and passes beneath the flap 48. The pump 82 is operative and water under pressure passes through the nozzles 41 and this water will impinge on to the root side of the sod and commence removal of the soil as previously defined therefrom.

It will be seen, particularly from FIG. 3 that the nozzles 41 may be of different types so that the sod can sequentially be struck with a relatively concentrated narrow stream of water and water more in a fan form so that the soil is initially broken up and displaced by the narrow streams and then washed away, with more removal by the wider streams. This process can be alternated or some other combination of different types of nozzles can be used along the length of the conveyor.

The water and removed soil is washed through and around the conveyor 20 into the receiver 30, as will be described later herein.

As illustrated the last two sets of nozzles, shown as 41a are fed through input 43 which is liquid which does not come from the recirculating tank 84 but is effectively clean water which serves two purposes.

Firstly, it ensures the sod as it leaves the conveyor 21 is clean and has little or no loose particles of soil thereon and, secondly, it forms the make up water for the system as whilst, as will be described, a substantial part of the water is recirculated there is a certain loss both on the washed sod as it leaves the system and in the soil as will be described later.

The sod after it passes under the flap 49 passes under the calender roll 51 which has spring 52 to apply pressure thereon and this causes the removal of a substantial part of the free water on the sod at the time and this water passes over the side of the washed sod or through the sod and through the conveyor into the receiver 30.

The sod then passes onto the upper flight 60 of the outlet conveyor 12 which carries it downwardly to the conveyor 65 or to the take up mechanism. This could be a form of cradle similar to cradle 14, which provides constant lineal speed or could be a take up roll having means whereby the speed of rotation varies with the diameter of the roll.

Returning to the material passing into the receiver 30 this will have a combination of water, humus and other organic materials, larger sized solid materials and soil.

The receiver is so formed that any solid material that drops out in the receiver will pass along the floor 31 to the outlet 33 and into the chamber 70.

The water level in the chamber 70 will rise higher than the weir 71 and will flood over this and over the screen 72. The water and soil will generally pass through the screen 72 whilst the larger sized solid material will pass down the screen and leave the machine at the open front 73 of the chamber 70.

The residence time in this area is such that the solid material does not carry great quantities of water therewith.

As illustrated we have shown a collection bin 74 beneath the open front 73 of the compartment but if a large quantity of material is passing through the machine we could provide a conveyor or the like to remove this material.

Generally this material does not have to be wasted, it can be returned to the field as part of the growing medium although, of course, if there were large stones or the like these should be removed therefrom.

The water and soil which pass through the screen 72 are caused to move into the first portion 75 of the recirculating tank 84 and we find that a substantial part of the entrained soil immediately drops to the bottom of this part.

We do however provide a weir or the like 78 which constrains the water and soil to move downwardly and this tends to reduce its velocity and aids in the dropping out of the material.

The water and the still entrained soil, which will generally be the fines, then moves upwardly and over the high portion 77 of the tank and the general forward speed of the water at this time is relatively slow and we find that a substantial portion of the fines then drop to the bottom of the portion 76 of the recycling tank 84.

Once the tank is full, as water enters the tank other water is also removed by the pump 82 as it overflows into the outlet 81 and is recycled to the washing nozzles.

The build up of material in the bottom of the portions 75 and 76 is removed from the machine by outlets 79 and 80 which may be in the form of valves and these can be adjusted so that the material leaving therethrough is in the form of a thick slurry and the removal can be continuous once the operation has been stabilised.

This material can again be passed to a conveyor or into a receiver and can readily be reused either in the area from which the sod was cut or in some other area, as it basically comprises the soil in which the sod was grown.

It will be seen, as previously mentioned, that there will be water loss in the system, the humus and other solid material will be wet when they leave the screen 72. The washed sod itself will still have a water content after it passes beneath the calendering roller 51 and the soil as it leaves the portions 75 and 76 of the recirculating tank will be in the form of a slurry. As mentioned previously, this water is normally made up by fresh water passing in to inlet 43 to operate the nozzles 41a.

Depending upon the particular application it may be that an auxiliary pump, not shown could supply this water or if the machine is being used where water is reticulated the water pressure of the reticulated supply may be all that is necessary to cause the nozzles 41a to operate satisfactorily and to provide the make up supply.

Alternatively, water may be taken from the recirculation tank 84 and can be treated to remove the fines therefrom and then this water is used in the inlet 43 to pass through the nozzles 41a. A process which adds a chemical to cause flocculation and settling of the fines can provide such water.

If this is done, water make up may be by means of a level sensor, such as a ball valve in the recirculation tank 84, which operates to permit the addition of water to the system.

It is known that the condition of the sod can be improved if the sod is cooled and we could incorporate a chiller in the water source or the inlet line 43 so that the last treatment step ensures that the temperature of the sod is reduced. Further, it may be desirable to incorporate chemical treatment at this stage and the chemicals can be added to the final rinse water.

It will also be seen that the water which is delivered with the humus or the soil is not passed to waste as the humus and the soil can both be placed back on the ground and thus any nutrients held in the water with these is applied to the ground for future growth.

When the machine is being shut down there will be water which has to be disposed of and which could have a high nutrient content but, because of the relatively small quantity, this can readily be placed back on the fields rather than let run to waste into the river system or the like. Alternatively, this could be chemical treatment to precipitate the nutrients.

To provide an indication, using a conventional washing process of effectively the same capacity of the recirculating machine described herein, the water usage could be as much as 7000 liters per minute as compared with a usage of as little as 100 liters per minute using the system of the invention.

Earlier in this description we stated that it was possible that the machine can be transportable and reference is made to FIGS. 5 and 6 which show the machine broken down for transport.

In this Figure the washing assembly 11, which includes the receiver 36 is shown as being located in the recycling tank 84.

It will be appreciated that the only direct connection between the washing assembly 11 and the remainder of the machine is by the output 33 of the receiver which is connected to the inlet of the chamber 70 by way of the collar or the like 34 which is separated, the inlet supply 83 from the pump 82 which is in connection by way of a flange joint or the like 36 to the supply pipe 42 and the inlet 43 for the make up water which can be in connection with the reticulated supply or a subsidiary pump and which can readily be disconnected therefrom.

The drive of the conveyor 20 also needs to be disconnected.

The conveyor assemblies 10 and 12 are simply disconnected and can lie across the top of the recirculating tank 84. The input cradle 14 and the output conveyor 65 may be located on the devise or may be located separately therefrom.

When the machine is in the condition shown in FIGS. 5 and 6 it can be of such a size as to be able to mounted on the tray of a truck or on a trailer or on a semi-articulated vehicle for transport purposes and in some applications, if required, the frame of the recirculating tank could be a trailer which enables ready relocation of the machine.

This is of great importance as, in many applications, it is desirable to wash the sod close to its point of harvest. This is advantageous in two major ways. First, the cost of freight is minimised. It will be appreciated that a substantial part of the weight in sod is in the soil in the root mass. Secondly, the soil recovered can be returned to the field at minimum expense as it does not have to be freighted for any substantial distance.

In the introduction we referred to the possibility of using settling tanks with a normal washing machine but apart from being very expensive they are inconvenient, the solid material has to be removed from the tanks by a front end loader or the like and this cannot easily be done if the tank is filled with water. The provision of such tanks is not feasible if washing is to be done at different sites.

Whilst in the embodiment fully described herein, we deliver the sod soil side up to the washing station, it is possible to deliver the sod soil side down, with the nozzles being beneath the conveyor. This can have an attraction as the soil drops away from the sod but a disadvantage in that the conveyor occludes some of the water flow and thus decreases efficiency. The direction of washing becomes, to a certain extent, a matter of choice for particular users.

Also, whilst we have described the washing station as being located above the recycling tank, with the sod being carried to the washing conveyor by other conveyors, it is possible, particularly where large rolls are being washed, to locate them close to the washing conveyor, as from a fork lift or the like, without using an in-feed conveyor. Similarly, it is possible to re-roll the washed sod at the level of the washing station without a delivery conveyor.

Also, whilst the embodiment illustrated is the best method of applying the invention, where a transportable recycling washing system is required, it is possible for other installations to have the washing conveyor effectively at ground level and to feed the water from the receiver to the recycling tank other than by gravity. For example, we could provide an additional pump to effect this movement.

Also, in the embodiment, we have described the washing as being done by rows of nozzles. Although this is a preferment, we can use spray bars which provide a curtain of water to effect the washing.

Referring now to FIGS. 7 to 9, and FIG. 1 we show the input cradle 14, which can also be used as a take-up cradle.

The cradle can have two side members 90 and these may be associated with extensions 91 which can be fitted in to tubes 92 which are themselves connected to the lower end of the conveyor assembly 10.

The side members 90 are preferably arcuate at their upper surface to allow ready location therein and between the arcuate members there are four rollers 93 to 96. The rollers 93, 94 and 95 each have a sprocket 97, 98 and 99 attached to the end thereof beyond the plate 90 and roller 96 has a twin sprocket which includes a sprocket 100 and a second co-axial sprocket 101.

The drive to the sprockets 97 to 100 is then achieved by a chain 102 which passes around the sprockets and an idler sprocket 103 is provided to tension the chain 102.

Sprocket 101 is connected to a sprocket 104 which is co-axial with the conveyor pulley or the like and a further idler 105 permits the chain 106 to pass over the correct side of the sprocket 101 to permit rotation of the rollers 93 to 96 in the correct sense.

Referring specifically to FIG. 9, the roll of sod 15 is located in the cradle 14, root side out and, depending upon the size of the roll so it may initially rest on rollers 94 and 95 or 93 and 94 but, as it becomes smaller so it will tend to rest on rollers 94, 95 and 96.

The diameters of the sprockets 104, 101 and 97, 98, 99 and 100 are selected so that the rate of unrolling the sod is equal to the rate on which the upper flight 16 of the input conveyor 10 moves and as the cradle is driven by the conveyor 10 this relationship is maintained on changes in conveyor speed.

That is, the rollers are rotating at a lineal speed equal to the speed of the conveyor so that any change in the diameter of the roll of sod has no effect on the speed at which the sod is delivered to the conveyor.

It is to be appreciated that this is most important as there should be no extensive forces on the sod and, at the same time, to ensure there is no bunching or the like there should be no compression either.

It will be seen that the cradle illustrated satisfactorily provides the desiderata.

It will also be seen that a similar cradle could be used at the take up end so that sod can be rewound in to a roll without applying any stress to the sod.

Also, at the take up end, the cradle could be arranged to wind the sod root side out or grass side out. When using narrow rolls, the roll is preferably root side out as this permits the roll to be moved along the ground whist being laid. With larger rolls, which need to be mechanically handled, there can be benefits in having the roll grass side out and the sod can be fed from a roll which is formed in this way. It is be seen, particularly from FIG. 8 that by changing the position of chain 104 relative to sprocket 101, the direction of rotation of the rollers 93 to 96 can be changed.

A cradle of this general type could be used as the take-up cradle in a harvester and we could use the input into the cradle to effect soil removal from the sod. This will be discussed later herein.

Another aspect of the invention relates to physical working of the sod to remove some, or all, of the soil therefrom.

This can be done in a number of different ways. Either separately or jointly and can also be done at various places in the handling of sod.

For example, mechanical removal of soil could be applied in the harvesting step.

The sod cut by a harvester is normally fed along some form of conveyor to a station where it is either rolled or cut to lengths for transport and handling.

The proposed forms to be described could be applied at this conveyor.

Secondly, the harvested sod could go through a process of mechanical working as a separate process and, particularly where the sod has been grown in sand or very frangible soil, it may be that for some applications the amount of soil removed would enable the sod to be then transported for laying.

Thirdly, the mechanical treatment could be effected before a washing process.

This could be most helpful in the use of equipment of the type described earlier herein where the capacity of the machine is dependant on the quantity of the soil to be removed and handled.

If this can be reduced then the total throughput of the machine can be increased accordingly.

Also if the soil is being removed in association with the washing process the soil removed can be added to the soil slurry obtained from the machine to permit the recovery and reuse of the soil.

Referring initially to FIG. 10 we show a conveyor 120 along which sod having the grass side 121 down is passing.

The roots 122 of this sod are, on the left side of the Figure encased in soil, as previously defined, 123.

In association with the conveyor there is a brush 124 which is mounted with its axis transverse to the conveyor 120 and which has stiff bristles 125 extending outwardly therefrom.

This brush rotates relative to the moving sod, and the rotation can be either with the direction of movement or against the direction of movement. As the bristles are relatively stiff there is a positive scouring effect provided by the bristles to remove soil from the sod.

If the soil has a relatively high clay content the percentage of the soil moved may not be high but if it is very frangible, for example in a form of loam or sand then a very high percentage of the total soil can be removed.

FIG. 11 shows a second embodiment and is a transverse view of sod 126 being moved along by a conveyor 127.

In this embodiment we provide a frame 128 which has fingers 129 extending downwardly therefrom.

The frame 128 can be adapted to reciprocate transverse to the movement of the conveyor and, indeed, this reciprocation can vary from a relatively great displacement to a vibration and we have found that the amount of soil removed can be comparable to that of the previous embodiment.

Fingers 129 can be used on the periphery of a brush similar to brush 124 of FIG. 10 instead of bristles. These fingers, although flexible, can, in some circumstances, enter the root mass more readily than bristles.

The embodiment of FIG. 12 is designed to demonstrate, in very schematic form, three different ways of removing soil.

In FIG. 12 there is a conveyor 130 to which sod from a roll 131 is passed from a cradle 132 and, mounted on the conveyor, there is a vibrating device shown, generally at 133. This could be provided by a relatively massive eccentric weight rotating about a journal which is connected to the conveyor or could be provided by an air-bag or the like which is pulsed by air or by an hydraulic fluid.

This device causes the conveyor to vibrate, preferably at a relatively high rate of vibration with small amplitude and this vibration can cause the soil to separate from the roots and be delivered from the sod.

A second method of separation is shown adjacent the upper pulley 144 where the sod is caused to move through a relatively sharp angle as it leaves the conveyor 130 before being delivered to a second conveyor 145, which conveyor is shown as being the washing conveyor of a washing machine.

In this case there is positive mechanical movement of the root system which will tend to open the root structure and to free soil therefrom. This soil will tend to drop away before the sod is passed to the washing step but even if not it will still be more susceptible to washing than would otherwise have been the case.

Also associated with the pulley, there is a nozzle 146 whereby compressed air, or an air/water mixture can be blown on to the sod.

This may be by means of a continual stream of air or air/water mixture or by pulsations of air or air/water to help remove soil from the sod. The water in this case is not used as a washing medium so much as a projectile, to cause physical movement of the soil.

In the description of the first embodiment, we stated that the conveyors move at the same speed. In some applications, it may be desirable to have the conveyors move at slightly different speeds. This can cause a physical working which can tend to separate the soil from the root mass and if the soil side is down, can even effect a degree of abrasion. Of course, any speed variation must be sufficiently slight as to ensure that no unnecessary stress is applied to the sod.

In a further embodiment, not illustrated, we can provide a scrubbing action which may use relatively stiff bristles of the type shown in the brush of FIG. 10 but on a flat base similar to that of FIG. 11 which can effect a scrubbing action against the roots to remove the soil as the product moves along a conveyor.

It is also possible, if required, to effect the mechanical working on pre-cut slabs of sod. In some applications rather than being provided in a roll, sod can be provided in slabs up to 1220 mm square and it would be possible to form these slabs and then to locate the slabs on, say, a vibrating table to remove a substantial part of the soil therefrom.

We mentioned earlier herein that the cradle 14 more specifically described in relation to FIGS. 7 to 9 can be used as a take-up cradle in a harvester. We can provide operations on the sod between the harvesting head and the cradle. For example, if the sod is dry or is friable, we could use physical working methods as described hereabove to remove part or all of the soil.

Also, we could move the sod, soil side down as is usual in harvesters, along a surface comprised of brushes and these brushes can be caused to move relative to the movement of the sod. Also, over part or all of the length water can be applied to the sod to effect a washing as well as the physical working.

If the sod is moist, we can use a mixture of the processes set out above together with washing and we can pass the harvested sod through a washing station in which it is struck on all surfaces by water to fully or substantially remove the soil during the washing process.

A still further aspect of the invention relates to handling sod in rolls.

Particularly where wide rolls, that is rolls of up to 1220 mm in width, of sod are being handled it has been proposed to place the sod on to a carrier, normally a mesh material.

By doing this, if there is any fault in the sod, if for example a portion of the sod is relatively weak, then it tends not to be torn apart or to simply fall apart on its movement along a conveyor or moving between conveyors.

A further aspect of the invention provides means whereby turf which is supported by a mesh can be effectively passed through a washing machine and also means whereby the sod can pass through a washing machine whilst not supported but can be supported either at the input end or the output or both.

Referring firstly to FIG. 14 this shows, very schematically, a washing conveyor having an upper flight 115, an input conveyor having an upper flight 116 and an output conveyor having an upper flight 117 associated with a washing assembly 118. This arrangement can be considered similar to FIG. 1.

In this case the sod is harvested with the root side resting on a mesh and formed in to rolls in this way.

As delivered to the conveyor flight 116 the root side is upwardly directed and thus the mesh 120 is delivered on top of the sod.

The mesh can be a relatively open mesh which does not substantially restrict water flow from the nozzles of the washing assembly 118 so the washing process is carried out as previously described with the mesh in place. The sod and mesh are passed to the delivery conveyor to a take up assembly which may be similar to the delivery assembly of FIGS. 7 to 9 herein, by which the sod is preferably rolled with the root side out so that it is easy to unroll into position on the ground surface.

The arrangement shown in FIG. 15 is effectively identical to that of FIG. 14 except that the mesh 121 is stripped from the sod 119 as it leaves the conveyor flight 116 and passes by an alternative route, shown to be above the spray assembly 118 until it is recombined with the sod as or after it leaves the conveyor 115.

In this embodiment there is no obstruction between the sod and the spray nozzles so the washing process occurs in the same way as it would have done for the earliest described embodiment herein.

FIG. 16 is a similar embodiment which shows the sod 119 as being unsupported at the input end and show a roll of mesh 124 being fed down on to the sod and being located by roller 125 after the sod has passed through the washing process.

It will be appreciated that in this form there could be mesh on the sod as it moves up along the conveyor 116 and it could be stripped therefrom and rolled on to a take up roller mounted above the assembly which mesh could then later be reused if it is considered to be a reusable commodity.

FIG. 17 shows a similar arrangement in which the mesh is fed from feed roll 124 and associated with the sod as it passes to the washing conveyor 115 so as to provide additional support to the underside thereof as is on the conveyor and is suffering stress from the force of the impinging water. As the sod leaves the washing conveyor, the mesh is stripped therefrom and passed to a take up roll.

Each of these three embodiments enables ready handling of wide strips, which can be somewhat fragile without there being any great likelihood of damage to the strips whilst they pass through the washing process. The mesh may be located above or beneath the sod, depending on the support being given.

Also, they provide a roll of washed sod which has supporting mesh ready for laying and during the laying process the mesh can be stripped from the roll or, in some applications, can be left on the ground surface with the sod.

FIGS. 19, 20 and 21 show, respectively sod as harvested, grass side down, sod in which the soil has been removed by washing or otherwise and sod with the soil removed but with a supporting in position.

In this specification we have described many different applications of handling and working sod and some of these applications have been expressed in rather broad terms but will generally themselves provide an indication as to their applications.

We claim:

1. A sod handling system, comprising:
   a delivery or take-up cradle for delivering or receiving material in the form of a roll, said delivery or take-up cradle including a plurality of rollers being located so that said material in the form of a roll is supported by at least one of said plurality of rollers; and,
   means for driving at least one of said plurality of rollers so that sod is capable of being delivered or taken up by said delivery or take-up cradle.

2. The sod handling system according to claim 1, wherein said plurality of rollers are located so that sod is capable of being delivered, or taken up, by said delivery or take-up cradle at a constant linear speed.

3. The sod handling system according to claim 2, wherein said plurality of rollers are each driven at the same speed by said means for driving.

4. The sod handling system according to claim 3, further comprising conveyor means, wherein said plurality of rollers are driven by said means for driving from said conveyor means to which, or from which, said delivery or take-up cradle is to deliver, or to receive, the material so that, irrespective of speed of movement of said conveyor means, peripheries of said plurality of rollers of said delivery or take-up cradle, and thus the material, moves at a linear speed which is the same as the linear speed of said conveyor means.

* * * * *